United States Patent
Rajkotia

(10) Patent No.: US 7,805,108 B2
(45) Date of Patent: Sep. 28, 2010

(54) APPARATUS AND METHOD FOR IMPROVED CALL RELEASE IN A WIRELESS NETWORK

(75) Inventor: Purva R. Rajkotia, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 504 days.

(21) Appl. No.: 10/764,175

(22) Filed: Jan. 23, 2004

(65) Prior Publication Data
US 2005/0164742 A1    Jul. 28, 2005

(51) Int. Cl.
| H04B 7/185 | (2006.01) |
| H04B 7/00 | (2006.01) |
| H04B 1/38 | (2006.01) |
| H04W 4/00 | (2009.01) |
| H04J 3/16 | (2006.01) |

(52) U.S. Cl. .............. 455/13.4; 455/522; 455/561; 455/515; 370/328; 370/465

(58) Field of Classification Search ............. 455/13.4, 455/522, 561, 515; 370/328, 465
See application file for complete search history.

(56) References Cited

U.S. PATENT DOCUMENTS

| 6,169,731 | B1* | 1/2001 | Stewart et al. ............ 370/332 |
| 6,418,322 | B1* | 7/2002 | Kim et al. ................... 455/522 |
| 6,445,686 | B1* | 9/2002 | Hoffbeck et al. ........... 370/318 |
| 2002/0041584 | A1* | 4/2002 | Sashihara .................. 370/337 |
| 2002/0068586 | A1* | 6/2002 | Chun et al. ................ 455/414 |
| 2002/0090947 | A1* | 7/2002 | Brooks et al. ............. 455/436 |
| 2003/0171124 | A1* | 9/2003 | Kataoka .................... 455/453 |
| 2004/0029604 | A1* | 2/2004 | Raaf .......................... 455/522 |

FOREIGN PATENT DOCUMENTS

KR    2001-066277 A  *  7/2001

OTHER PUBLICATIONS

DERWENT-ACC-No. 2002-357489.*

* cited by examiner

Primary Examiner—Vincent P Harper
Assistant Examiner—Marisol Figueroa

(57) ABSTRACT

The present invention decreases the time required to determine whether a call connection between a base station and a mobile station in a wireless network has failed during a call set up procedure. A preamble frame detector in the base station detects preamble frames transmitted by the mobile station. When the base station detects missing preamble frames the base station increases the power level of null frames that the base station transmits to the mobile station. The more powerful null frames increase the likelihood of a successful call connection. The base station releases the call if a connection is not made in less than five seconds. The mobile station similarly releases unsuccessful call connections.

17 Claims, 10 Drawing Sheets

APPARATUS AND METHOD FOR IMPROVED CALL RELEASE IN A WIRELESS NETWORK

TECHNICAL FIELD OF THE INVENTION

The present invention is generally related to wireless networks and, in particular, to a wireless network that uses an improved technique for performing a call release.

BACKGROUND OF THE INVENTION

Wireless communication systems have become ubiquitous in society. Business and consumers use a wide variety of fixed and mobile wireless terminals, including cell phones, pagers, Personal Communication Services (PCS) systems, and fixed wireless access devices (e.g., vending machine with cell phone capability). Wireless service providers continually try to create new markets for wireless devices and expand existing markets by making wireless devices and services cheaper and more reliable. The prices of wireless devices have decreased to the point where nearly everyone can afford them. To continue to attract new customers, wireless service providers are implementing new services, especially digital data services that, for example, enable a user (or subscriber) to browse the Internet and to send and receive e-mail.

Mobile stations (e.g., cell phones, PCS handsets, portable computers, telemetry devices, and the like) frequently drop calls. The dropping of a call may occur when a mobile station temporarily moves behind an obstruction (e.g., a building) so that the radio frequency signals between the base station and the mobile station are blocked.

The mobile station comprises a fade timer that keeps track of how much time elapses after the mobile station has received a bad frame. If a prior art mobile station receives a bad frame then the fade timer waits for five (5) seconds after the bad frame has been received. If the mobile station receives two (2) consecutive good frames within the five (5) second period, then the mobile station resets the fade timer (to await the next bad frame) and the call continues. If the mobile station does not receive two (2) good consecutive good frames within the five (5) second period, then the mobile station declares the call a failure, cancels the call, releases the mobile station resources, and waits for (or makes) the next call attempt.

Therefore, in prior art wireless networks, if a call is going to fail, the resources for the call are going to be consumed for a full five (5) seconds before the call is determined to be a failure. This method is an inefficient method for handling call release. The disadvantage of this prior art method is that the call resources are wasted for five (5) seconds in those cases where the chances of a successful call are not very high.

The telecommunication industry is presently moving toward increasing the speed of the call set up procedure. This is being done by eliminating some of the intermediate handshaking signals between the base station and the mobile station. As the speed of the call set up procedure is increased, the chances of call failure also increase. Using a full five (5) seconds to declare that a call has failed will not be efficient for the higher speed call set up procedures. The release of a failed call must be accomplished more quickly so that the next call attempt may be made more quickly.

Therefore, there exists a need for an improved system and method for more efficiently declaring a call failure and performing the release of a call between a base station and a mobile station. There also exists a need for an improved system and method that minimizes the use of base station resources and mobile station resources when a call between the base station and the mobile station is released.

SUMMARY OF THE INVENTION

The present invention discloses a system and method for efficiently decreasing the time required to determine whether a call connection between a base station and a mobile station in a wireless network has failed during a call set-up procedure.

To address the above-discussed deficiencies of the prior art, it is a primary object of the present invention to provide, for use in a wireless network, a base station capable of efficiently releasing a call between the base station and a mobile station. During the call set-up procedure the base station sends null frames to the mobile station and the mobile station sends preamble frames to the base station. A preamble frame detector in the base station detects the preamble frames transmitted by the mobile station. When the preamble frame detector detects missing preamble frames then a transmit power controller in the base station increases the power level of the null frames that the base station transmits to the mobile station. The more powerful null frames increase the likelihood of a successful call connection between the base station and the mobile station. A fade timer in the base station begins counting when the first missing preamble frame is detected. The base station releases the call if a connection is not made in less than five seconds.

To address the above-discussed deficiencies of the prior art, it is another primary object of the present invention to provide, for use in a wireless network, a mobile station capable of efficiently releasing a call between the mobile station and the base station. During the call set-up procedure the base station sends null frames to the mobile station and the mobile station sends preamble frames to the base station. A null frame monitor program in the mobile station detects the null frames transmitted by the base station. When the null frame monitor program detects missing null frames then a transmit power control program in the mobile station increases the power level of the preamble frames that the mobile station transmits to the base station. The more powerful preamble frames increase the likelihood of a successful call connection between the base station and the mobile station. A fade timer in the mobile station begins counting when the first missing null frame is detected. The mobile station releases the call if a connection is not made in less than five seconds.

It is object of the present invention to provide a base station that is capable of increasing a power level of null frames transmitted by the base station to facilitate the successful completion of a call connection to a mobile station during a call set-up procedure.

It is another object of the present invention to provide a base station that is capable of increasing a power level of null frames transmitted by the base station by a step size having a configurable value.

It is still another object of the present invention to provide a base station that is capable of successfully completing a call connection with a mobile station in less than five seconds.

It is yet another object of the present invention to provide a mobile station that is capable of increasing a power level of preamble frames transmitted by the mobile station to facilitate the successful completion of a call connection to a base station during a call set-up procedure.

It is also an object of the present invention to provide a mobile station that is capable of increasing a power level of preamble frames transmitted by the mobile station by a step size having a configurable value.

It is another object of the present invention to provide a mobile station that is capable of successfully completing a call connection with a base station in less than five seconds.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as to future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 10, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
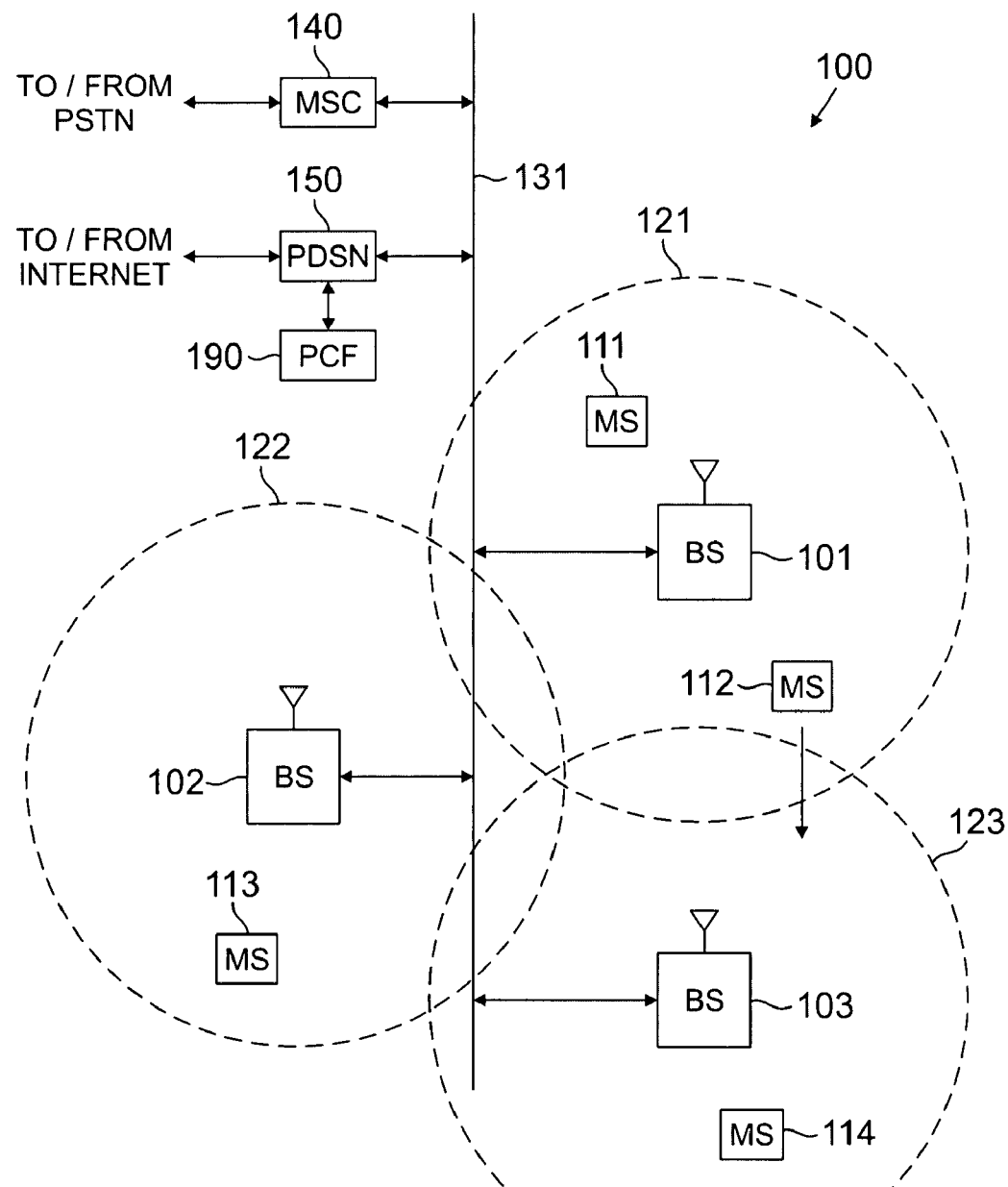
FIG. 1 illustrates an exemplary wireless network that implements an improved call release technique according to the principles of the present invention.

FIG. 1 illustrates exemplary wireless network 100, which implements an improved call release technique according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to, for example, the IS-2000-C standard (i.e., Release C of cdma2000). In an advantageous embodiment of the present invention, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

As will be more fully described, the base stations and the mobile stations within in wireless network 100 are capable of efficiently releasing a call in accordance with the principles of the present invention. The base stations and the mobile stations of the present invention minimize the use of base station resources and mobile station resources when a call between the base station and the mobile station is released.

Figure 2:
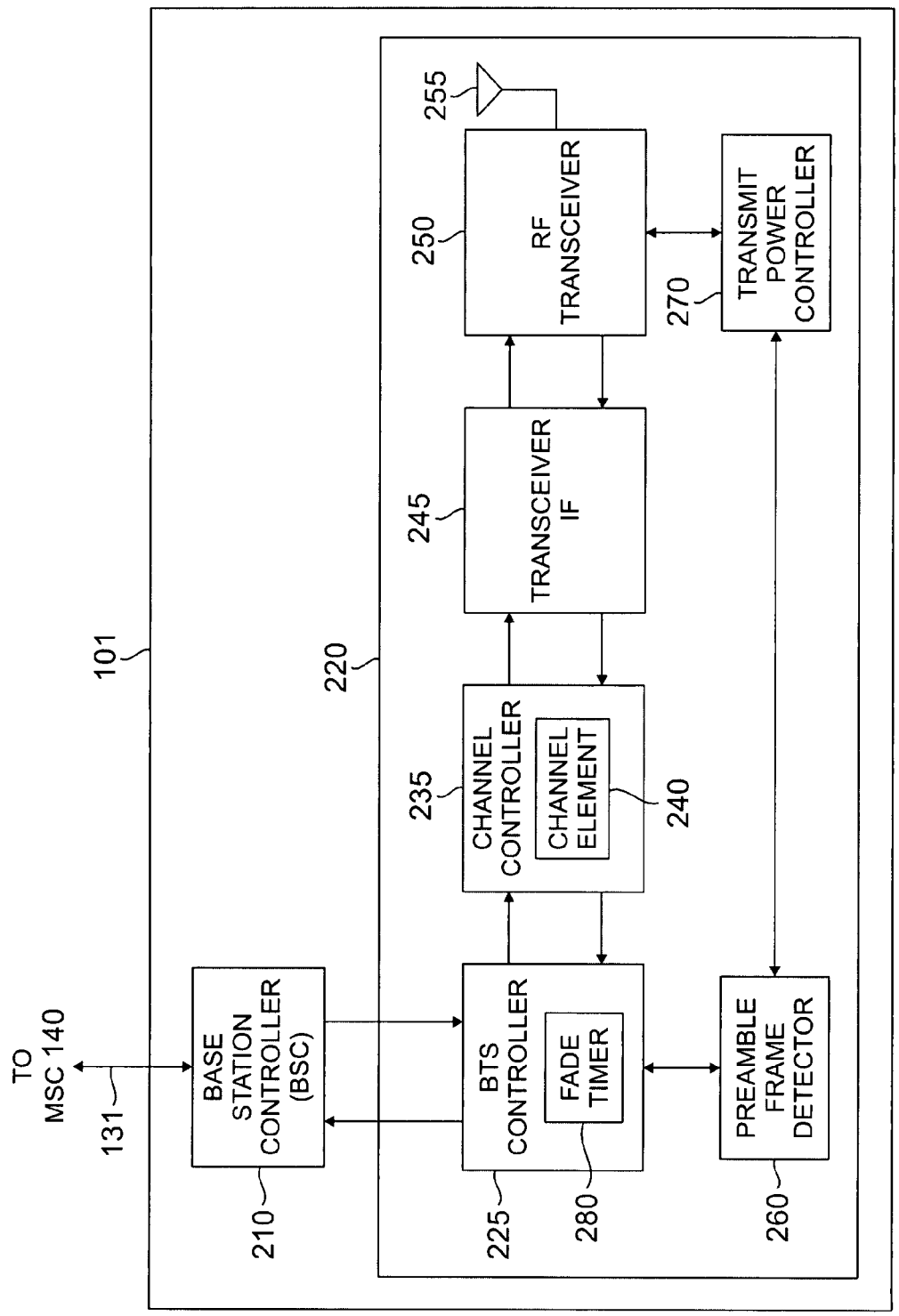
FIG. 2 illustrates in greater detail an exemplary base station according to one embodiment of the present invention.

FIG. 2 illustrates exemplary base station 101 in greater detail according to one embodiment of the present invention. Base station 101 comprises base station controller (BSC) 210 and base transceiver subsystem (BTS) 220. Base station controllers and base transceiver subsystems were described previously in connection with FIG. 1. BSC 210 manages the resources in cell site 121, including BTS 220. BTS 220 comprises BTS controller 225, channel controller 235, transceiver interface (IF) 245, RF transceiver unit 250, and antenna array 255. Channel controller 235 comprises a plurality of channel elements, including exemplary channel element 240. BTS 220 also comprises preamble frame detector 260 and transmit power controller 270. BTS Controller 225 also comprises fade timer 280.

BTS controller 225 comprises processing circuitry and memory capable of executing an operating program that communicates with BSC 210 and controls the overall operation of BTS 220. Under normal conditions, BTS controller 225 directs the operation of channel controller 235, which contains a number of channel elements, including channel element 240, that perform bi-directional communications in the forward channels and the reverse channels. A forward channel refers to a channel in which signals are transmitted from the base station to the mobile station. A reverse channel refers to a channel in which signals are transmitted from the mobile station to the base station. In an advantageous embodiment of the present invention, the channel elements communicate according to a code division multiple access (CDMA) protocol with the mobile stations in cell 121. Transceiver IF 245 transfers the bi-directional channel signals between channel controller 240 and RF transceiver unit 250.

Antenna array 255 transmits forward channel signals received from RF transceiver unit 250 to mobile stations in the coverage area of BS 101. Antenna array 255 also sends to transceiver 250 reverse channel signals received from mobile stations in the coverage area of BS 101. In a preferred embodiment of the present invention, antenna array 255 is a multi-sector antenna, such as a three-sector antenna in which each antenna sector is responsible for transmitting and receiving in a one hundred twenty degree (120°) arc of coverage area. Additionally, RF transceiver 250 may contain an antenna selection unit to select among different antennas in antenna array 255 during transmit and receive operations.

Figure 3:
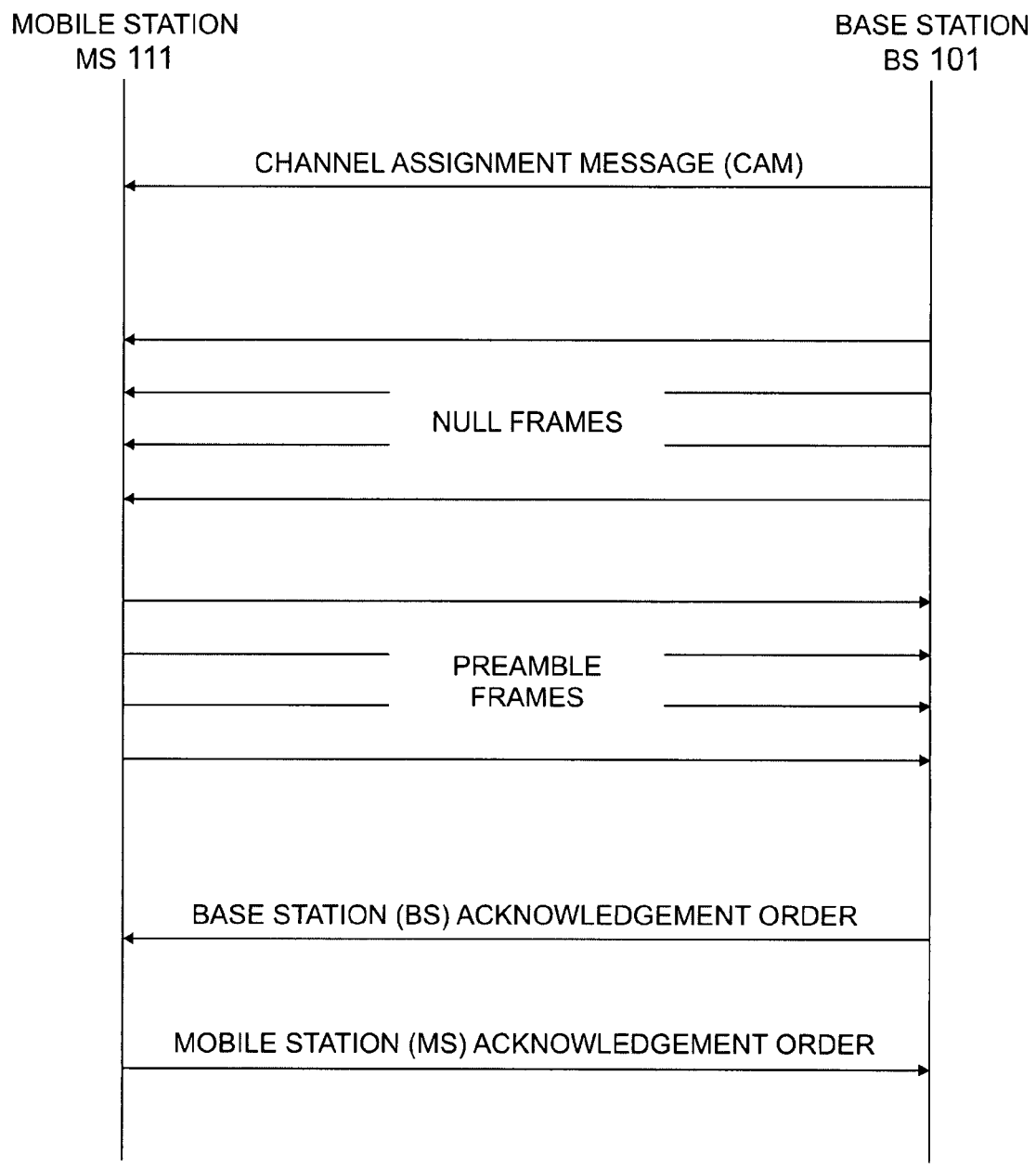
FIG. 3 illustrates a prior art procedure for setting up a call between a mobile station and a base station.

During a prior art call set-up procedure a base station (e.g., base station 101) sends a Channel Assignment Message (CAM) to a mobile station (e.g., mobile station 111). Base station 101 sends a series of null frames to mobile station 111 on a first radio frequency. After mobile station 111 receives two (2) good null frames from base station 101 then mobile station 111 starts sending a series of preamble frames to base station 101 on a second radio frequency. Base station 101 then sends a Base Station Acknowledgement Order to mobile station 111. Mobile station 101 then sends a Mobile Station Acknowledgement Order to base station 101. This procedure is illustrated in FIG. 3. Although the transmission of the null frames and the preamble frames are shown in separate portions in FIG. 3, the transmissions occur simultaneously.

According to an exemplary embodiment of the present invention, preamble frame detector 260 of base station 101 detects the arrival of preamble frames from mobile station 111. At some point the preamble frame detector 260 may determine that no preamble frames are being received from mobile station 111. This may happen because either (1) mobile station 111 moved out of the signal reception range of base station 101, or (2) mobile station 111 has temporarily moved behind some obstruction that blocks the reception of the preamble frames by preamble frame detector 260.

When preamble frame detector 260 detects the absence of the first missing preamble frame then BTS Controller 225 starts fade timer 280. BTS Controller 225 then waits for a specified period of time (or for a specified number of frames) to make allowance for the propagation delay time and the time required to decode previously sent frames. If no new preamble frames arrive from mobile station 111 during the specified waiting period, then BTS Controller 225 stops transmitting null frames to base station 111 and waits to receive preamble frames from mobile station 111.

If the preamble frame detector 260 detects the arrival of preamble frames from the mobile station 111 (before the fade timer 280 expires) then BTS Controller 225 turns off fade timer 280 and continues the call set-up procedure. If the preamble frame detector 260 does not detect the arrival of preamble frames from the mobile station 111, then BTS Controller 225 determines whether the fade timer 280 has expired. If the fade timer 280 has expired then BTS controller 225 immediately terminates the call set-up procedure and releases the call and the base station resources.

If the fade timer 280 has not yet expired, then BTS Controller 225 sends a control signal to transmit power controller 270 to cause the transmit power controller 270 increase the transmission power for the null frames by a specified increment or step size. An exemplary power increment or step size is two decibels (2 dB) for each twenty millisecond (20 msec) frame. The initial transmission power on a forward traffic channel for Radio Configuration One (RC1) and Radio Configuration Two (RC2) is a mean power level defined by the expression:

Mean output power (dBm)=−mean output power (dBm)+offset power+interference rejection+$ACC$_Corrections+$RLGAIN\_ADJ_s$+Fast Call set-up_step_size.

The Fast Call set-up_step_size is an adjustable parameter of the present invention for increasing the power level of the null frames in steps of a specified value of power in each frame. As previously mentioned, an exemplary value for the Fast Call set-up_step_size parameter is two decibels (2 dB) for each twenty millisecond (20 msec) frame. The other terms in the equation are well known and are defined in the IS-2000-C standard.

The initial transmission power on a forward pilot channel when transmitting on a forward traffic channel with Radio Configurations Three (RC3), Four (RC4), Five (RC5) or Six (RC6) is a mean power level defined by the expression:

Mean pilot channel output power (dBm)=−mean input power (dBm)+offset power+interference corrections+$ACC$_Corrections+$RLGAIN\_ADJ_s$+Fast Call set-up_step_size.

The Fast Call set-up_step_size is an adjustable parameter of the present invention for increasing the power level of the null frames in steps of a specified value of power in each frame. As before, an exemplary value for the Fast Call set-up_step_size is two decibels (2 dB) for each twenty millisecond (20 msec) frame. The other terms in the equation are well known and are defined in the IS-2000-C standard.

After the transmit power controller 270 increases the power level of the null frames by one step size, then BTS Controller 225 determines whether the maximum power level for the null frames has been exceeded. If the maximum power level for the null frames has been exceeded, then the likelihood that the call will be successfully completed is very low. Therefore, BTS Controller 225 ends the call and releases the resources of base station 101. If the maximum power level of the null frames has not been exceeded, then BTS Controller continues the call set-up procedure and preamble frame detector 260 continues to search for preamble frames from mobile station 111.

In FIG. 2 preamble frame detector 260, transmit power controller 270, and fade timer 280 are associated with base transceiver subsystem 220. It should be understood that this configuration is by way of illustration only and should not be construed to limit the scope of the present invention. Those skilled in the art will understand that in other embodiments, preamble frame detector 260, transmit power controller 270 and fade timer 280 may be associated with base station controller 210. In still other embodiments, preamble frame detector 260, transmit power controller 270, and fade timer 280 may be associated with both BTS 220 and BSC 210. What is essential is that base station 101 has access to the functionality provided by the preamble frame detector 260, the transmit power controller 270, and the fade timer 280.

Figure 4:
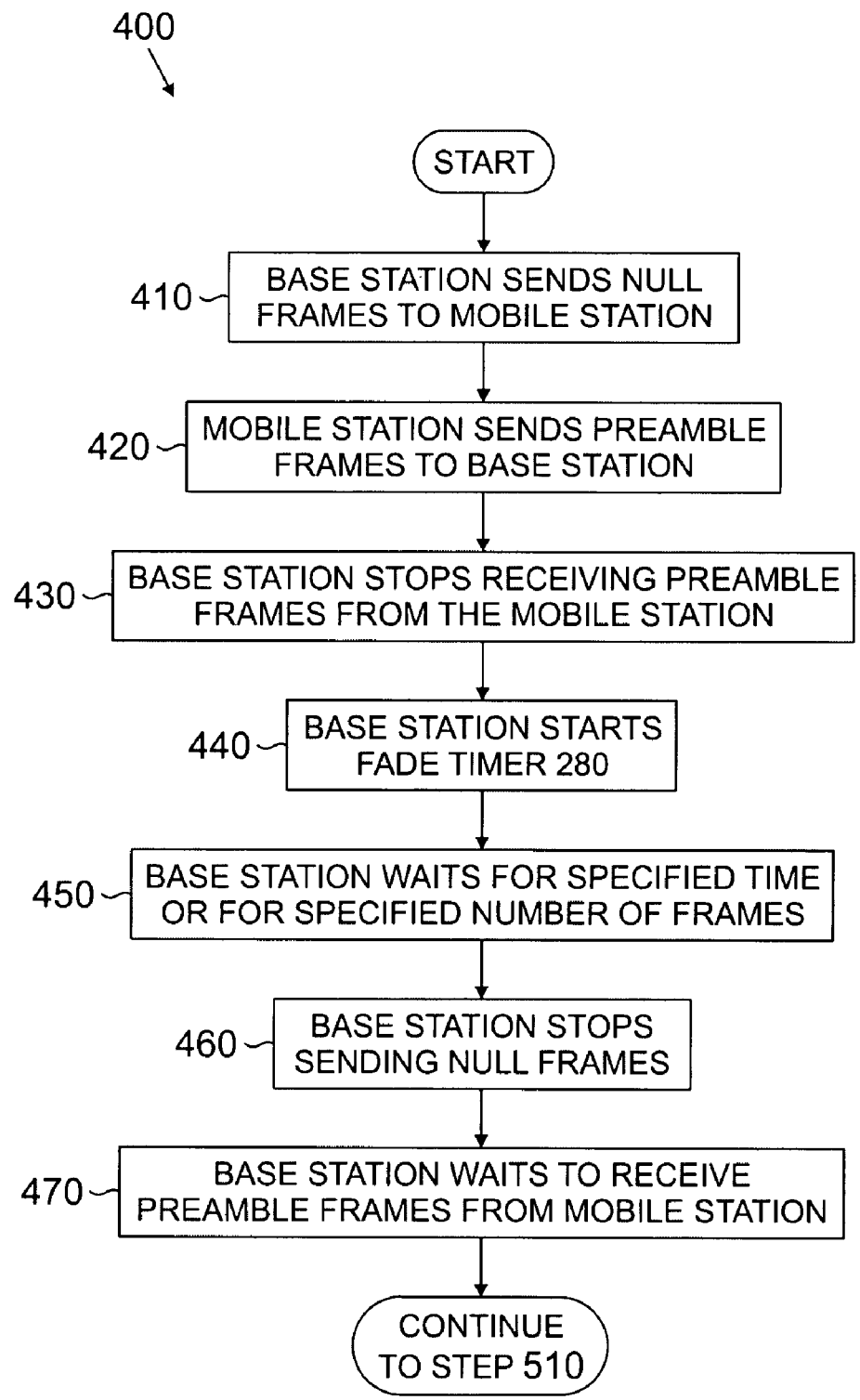
FIG. 4 is a flow diagram illustrating a first portion of the operation of the wireless network according to one embodiment of the present invention.

FIG. 4 is a flow diagram 400 illustrating a first portion of the operation of wireless network 100 according to one embodiment of the present invention. Base station 101 sends null frames to mobile station 111 (step 410). Mobile station 111 sends preamble frames to base station 101 (step 420). As previously mentioned, step 410 and step 420 occur simultaneously.

Base station 101 then stops receiving preamble frames from mobile station 111 (step 430). Base station 101 then starts the fade timer 280 (step 440). Then base station 101 waits for a specified time or for a specified number of frames (step 450). Base station 101 then stops sending null frames (step 460). Base station 101 then waits to receive preamble frames from mobile station 111 (step 470). Control then passes to step 510 shown in FIG. 5.

Figure 5:
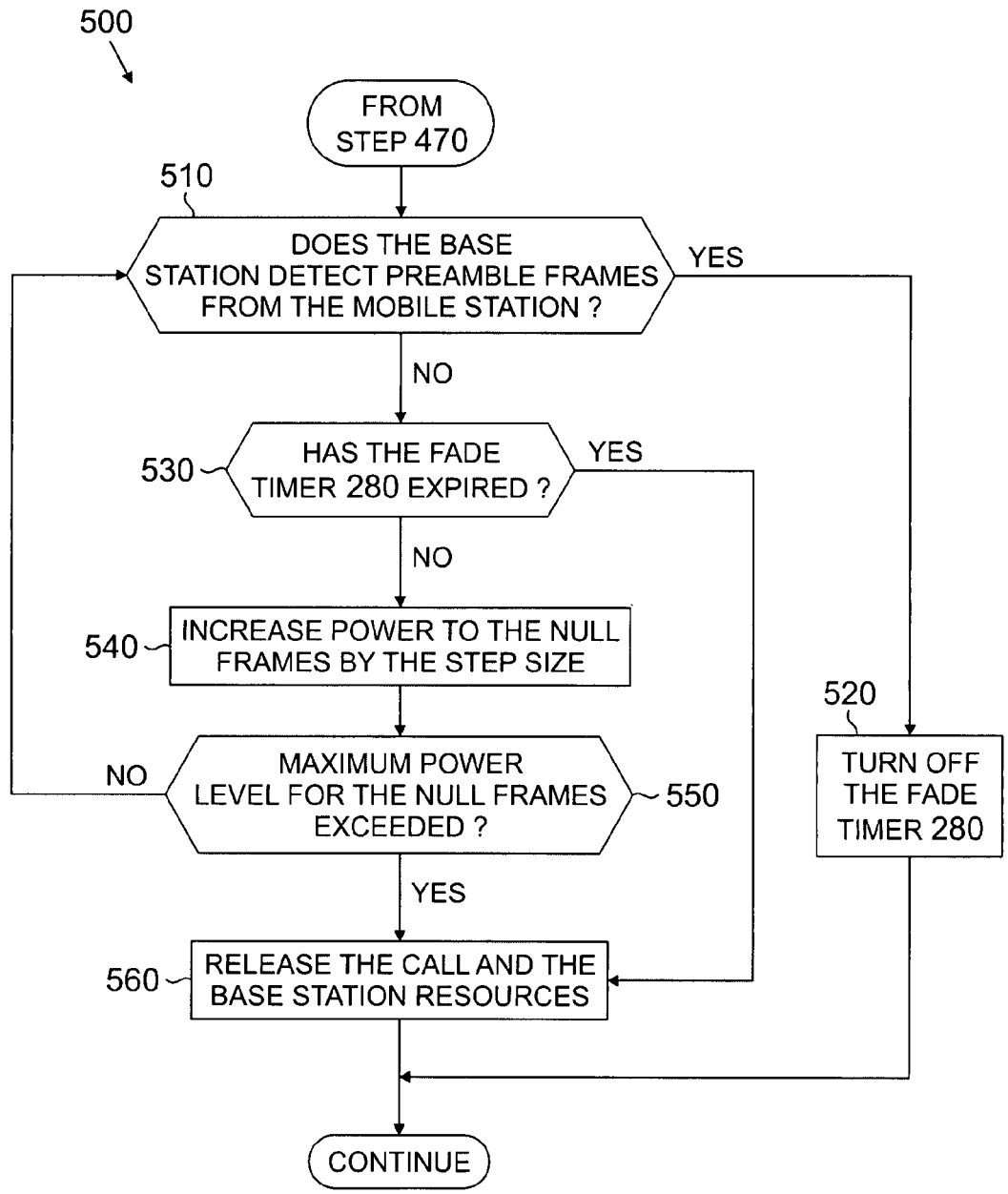
FIG. 5 is a flow diagram illustrating a second portion of the operation of the wireless network according to another embodiment of the present invention.

FIG. 5 is a flow diagram 500 illustrating a second portion of the operation of wireless network 100 according to one embodiment of the present invention. Base station 101 determines whether preamble frames from the mobile station 111 have been detected (decision step 510). If preamble frames are detected, then base station 101 turns off the fade timer 280 (step 520) and the call set-up procedure is continued.

If preamble frames are not detected, then base station 101 determines whether the fade timer 280 has expired (decision step 530). If the fade timer 280 has expired then base station 101 releases the call and the base station resources (step 560). If the fade timer 280 has not expired then base station 101 increases the power of the null frames by the step size (step 540).

Base station 101 then determines whether the maximum power level for the null frames has been exceeded (decision step 550). If the maximum power level for the null frames has been exceeded then base station 101 releases the call and the base station resources (step 560). If the maximum power level for the null frames has not been exceeded then base station 101 continues to search for preamble frames from mobile station 111 (step 510).

Figure 6:
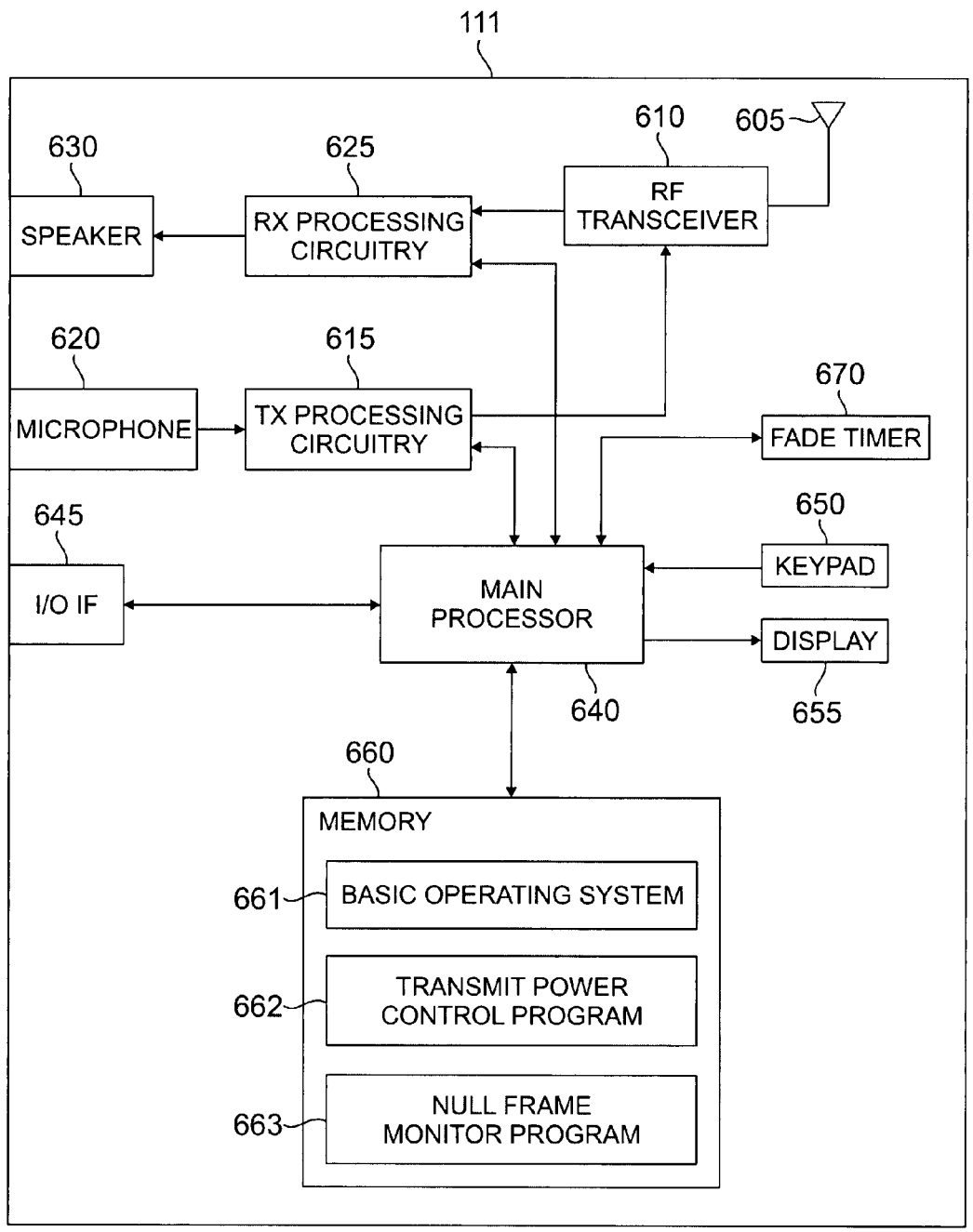
FIG. 6 illustrates an exemplary wireless mobile station according to an advantageous embodiment of the present invention.

FIG. 6 illustrates wireless mobile station 111 according to an advantageous embodiment of the present invention. Wireless mobile station 111 comprises antenna 605, radio frequency (RF) transceiver 610, transmit (TX) processing circuitry 615, microphone 620, and receive (RX) processing circuitry 625. Mobile station (MS) 111 also comprises speaker 630, main processor 640, input/output (I/O) interface (IF) 645, keypad 650, display 655, memory 660, and fade timer 670. Memory 660 further comprises basic operating system (OS) program 661, transmit power control program 662, and preamble frame monitor program 663.

Radio frequency (RF) transceiver 610 receives from antenna 605 an incoming RF signal transmitted by base station 101 of wireless network 100. Radio frequency (RF) transceiver 610 then down-converts the incoming RF signal to produce an intermediate frequency (IF) or a baseband signal. The IF or baseband signal is sent to receiver (RX) processing circuitry 625 that produces a processed baseband signal by filtering, decoding, and/or digitizing the baseband or IF signal. Receiver (RX) processing circuitry 625 transmits the processed baseband signal to speaker 630 (i.e., voice data) or to main processor 640 for further processing (e.g., web browsing).

Transmitter (TX) processing circuitry 615 receives analog or digital voice data from microphone 620 or other outgoing baseband data (e.g., web data, e-mail, interactive video game data) from main processor 640. Transmitter (TX) processing circuitry 615 encodes, multiplexes, and/or digitizes the outgoing baseband data to produce a processed baseband or IF signal. Radio frequency (RF) transceiver 610 receives the outgoing processed baseband or IF signal from transmitter (TX) processing circuitry 615. Radio frequency (RF) transceiver 610 up-converts the baseband or IF signal to a radio frequency (RF) signal that is transmitted via antenna 605.

In an advantageous embodiment of the present invention, main processor 640 is a microprocessor or microcontroller. Memory 660 is coupled to main processor 640. According to an advantageous embodiment of the present invention, part of memory 660 comprises a random access memory (RAM) and another part of memory 660 comprises a Flash memory, which acts as a read-only memory (ROM).

Main processor 640 executes basic operating system (OS) program 661 stored in memory 660 in order to control the overall operation of wireless mobile station 111. In one such operation, main processor 640 controls the reception of forward channel signals and the transmission of reverse channel signals by radio frequency (RF) transceiver 610, receiver (RX) processing circuitry 625, and transmitter (TX) processing circuitry 615, in accordance with well-known principles.

Main processor 640 is capable of executing other processes and programs resident in memory 660. Main processor 640 can move data into or out of memory 660, as required by an executing process. Main processor 640 is also coupled to I/O interface 645. I/O interface 645 provides mobile station with I/O the ability to connect to other devices such as laptop computers and handheld computers. I/O interface 645 is the communication path between these accessories and main controller 640.

Main processor 640 is also coupled to keypad 650 and display unit 655. The operator of mobile station 111 uses keypad 650 to enter data into mobile station 111. Display 655 may be a liquid crystal display capable of rendering text and/or at least limited graphics from web sites. Alternate embodiments may use other types of displays.

According to an exemplary embodiment of the present invention, null frame monitor program 663 of mobile station 111 detects the arrival of null frames from base station 101. At some point the null frame monitor program 663 may determine that no null frames are being received from base station 101. This may happen because either (1) base station 101 is not transmitting null frames, or (2) mobile station 111 has temporarily moved behind some obstruction that blocks the reception of the null frames from base station 101.

When null frame monitor program 663 detects the absence of the first null frame then main processor 640 starts fade timer 670. Main processor 640 then counts the number of consecutive missing null frames (up to a preselected number of null frames). Main controller 640 then waits for a specified period of time (or for a specified number of frames) to make allowance for the propagation delay time and the time required to decode previously sent frames. If no new null frames arrive from base station 101 during the specified waiting period, then main controller 640 causes transmit power control program 662 to increase the transmission power of the preamble frames.

In particular, if the fade timer 670 has not yet expired, then main controller 640 sends a control signal to the transmit power control program 662 to cause the transmit power control program 662 to increase the transmission power for the preamble frames by a specified increment or step size times the number of missing null frames. An exemplary power increment or step size is two decibels (2 dB) for each twenty millisecond (20 msec) frame. For example, if null frame monitor program 663 detects three (3) consecutive missing twenty millisecond (20 msec) null frames, then the increase in power for the preamble frames will be equal to three (3) times two decibels (2 dB) or six decibels (6 dB).

Then the null frame monitor program 663 continues to search for null frames from base station 101. If the null frame monitor program 663 detects the arrival of null frames from base station 101 (before the fade timer 670 expires) then main controller 640 turns off fade timer 670 and continues the call set-up procedure. If the null frame monitor program 663 does not detect the arrival of null frames from the base station 101, then main controller 640 determines whether the fade timer 670 has expired. If the fade timer 670 has expired then main controller 640 immediately terminates the call set-up procedure and releases the call and the mobile station resources.

If the fade timer 670 has not yet expired, then main controller 640 sends a control signal to the transmit power control program 662 to cause the transmit power control program 662 to increase the transmission power for the preamble frames by a specified increment or step size (e.g., two decibels (2 dB)). The initial transmission power on a reverse traffic channel for Radio Configuration One (RC1) and Radio Configuration Two (RC2) is a mean power level defined by the expression:

Mean output power (dBm)=−mean output power (dBm)+offset power+interference rejection+$AC$-$C$_Corrections+$RLGAIN\_ADJ_s$+Fast Call set-up_step_size.

The Fast Call set-up_step_size is an adjustable parameter of the present invention for increasing the power level of the preamble frames in steps of a specified value of power in each frame. As previously mentioned, an exemplary value for the Fast Call set-up_step_size parameter is two decibels (2 dB) for each twenty millisecond (20 msec) frame. The other terms in the equation are well known and are defined in the IS-2000-C standard.

The initial transmission power on a reverse pilot channel when transmitting on a reverse traffic channel with Radio Configurations Three (RC3), Four (RC4), Five (RC5) or Six (RC6) is a mean power level defined by the expression:

Mean pilot channel output power (dBm)=−mean input power (dBm)+offset power+interference corrections+$ACC$_Corrections+$RLGAIN\_ADJ_s$+Fast Call set-up_step_size.

The Fast Call set-up_step_size is an adjustable parameter of the present invention for increasing the power level of the preamble frames in steps of a specified value of power in each frame. As before, an exemplary value for the Fast Call set-up_step_size is two decibels (2 dB) for each twenty millisecond (20 msec) frame. The other terms in the equation are well known and are defined in the IS-2000-C standard.

After the transmit power control program 662 increases the power level of the preamble frames by one step size, then main controller 640 determines whether the maximum power level for the preamble frames has been exceeded. If the maximum power level for the preamble frames has been exceeded, then the likelihood that the call will be successfully completed is very low. Therefore, main controller 640 ends the call and releases the resources of mobile station 111. If the maximum power level of the preamble frames has not been exceeded, then main controller 640 continues the call set-up procedure and null frame monitor program 663 continues to search for null frames from base station 101.

Figure 7:
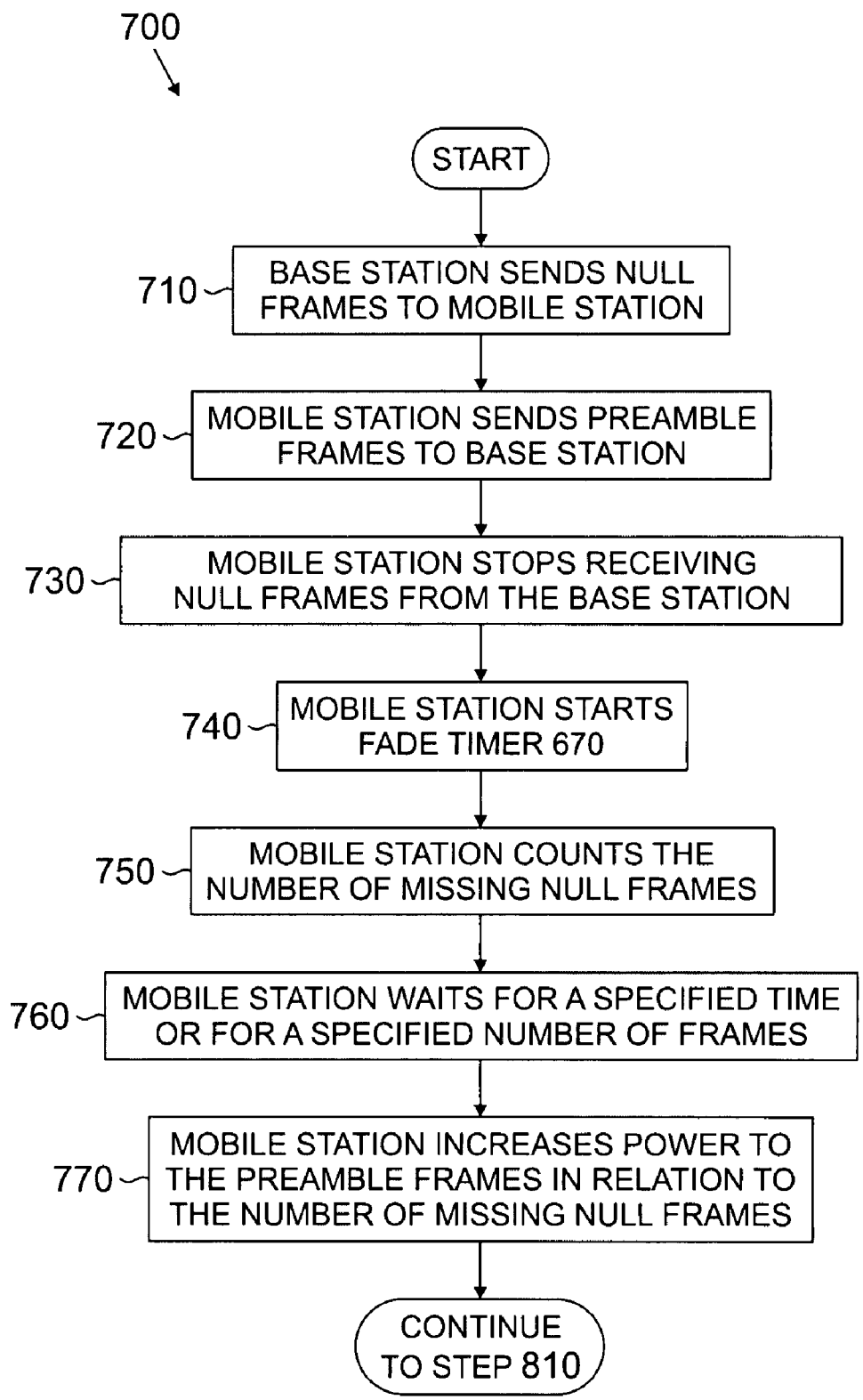
FIG. 7 is a flow diagram illustrating a third portion of the operation of the wireless network according to another embodiment of the present invention.

FIG. 7 is a flow diagram 700 illustrating a third portion of the operation of wireless network 100 according to one embodiment of the present invention. Base station 101 sends null frames to mobile station 111 (step 710). Mobile station 111 sends preamble frames to base station 101 (step 720). As previously mentioned, step 710 and step 720 occur simultaneously.

Mobile station 111 then stops receiving null frames from base station 101 (step 730). Mobile station 111 then starts fade timer 670. (step 740). Mobile station 111 then counts the number of missing null frames (step 750). Then mobile station 111 waits for a specified time or for a specified number of frames (step 760). Mobile station 111 then increases power to the preamble frames in relation to the number of missing null frames (step 770). Control then passes to step 810 shown in FIG. 8.

Figure 8:
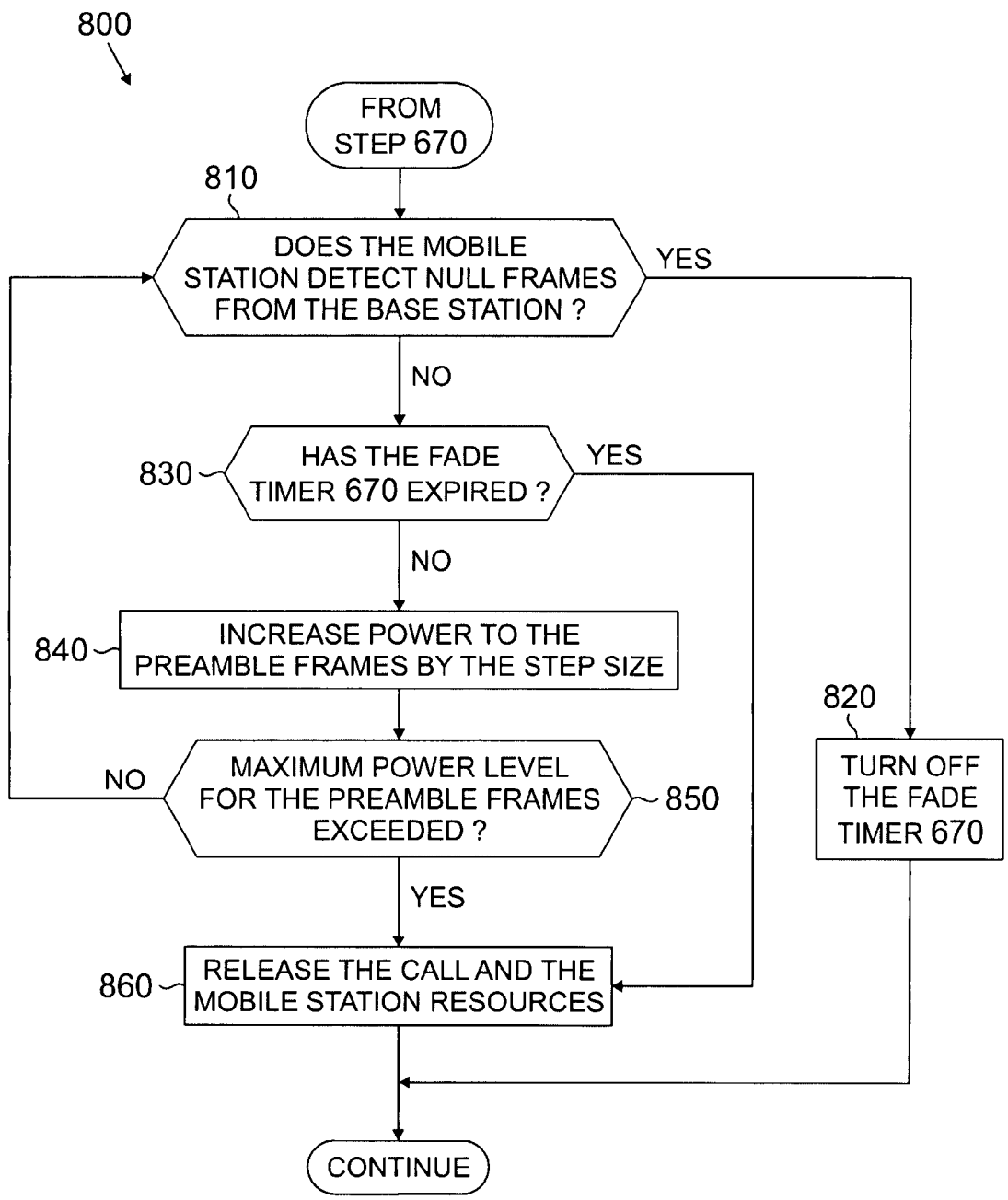
FIG. 8 is a flow diagram illustrating a fourth portion of the operation of the wireless network according to another embodiment of the present invention.

FIG. 8 is a flow diagram 800 illustrating a second portion of the operation of wireless network 100 according to one embodiment of the present invention. Mobile station 111 determines whether null frames from the base station 101 have been detected (decision step 810). If null frames are detected, then mobile station 111 turns off the fade timer 670 (step 820) and the call set-up procedure is continued.

If null frames are not detected, then mobile station 111 determines whether the fade timer 670 has expired (decision step 830). If the fade timer 670 has expired then mobile station 111 releases the call and the mobile station resources (step 860). If the fade timer 670 has not expired then mobile station 111 increases the power of the preamble frames by the step size (step 840).

Mobile station 111 then determines whether the maximum power level for the preamble frames has been exceeded (decision step 850). If the maximum power level for the preamble frames has been exceeded then mobile station 111 releases the call and the mobile station resources (step 860). If the maximum power level for the preamble frames has not been exceeded then mobile station 111 continues to search for null frames from base station 101 (step 810).

According to an alternate embodiment of the present invention, preamble frame detector 260 of base station 101 detects the arrival of preamble frames from mobile station 111. At some point the preamble frame detector 260 may determine that the power level of the preamble frames that are being received from mobile station 111 is increasing. This may happen because some obstruction is blocking mobile station 111 from receiving the null frames that are being transmitted by base station 101. When mobile station 111 determines that it is not receiving null frames from base station 101 then mobile station 111 starts to increase the power level of its preamble frames in the manner previously described.

When preamble frame detector 260 detects the increased power levels of the preamble frames of mobile station ill then BTS Controller 225 starts fade timer 280. BTS Controller 225 then waits for a specified period of time (or for a specified number of frames) to make allowance for the propagation delay time and the time required to decode previously sent frames.

BTS Controller 225 continues to send null frames to mobile station 111. BTS Controller 225 also determines whether the fade timer 280 has expired. If the fade timer 280 has expired then BTS controller 225 immediately terminates the call set-up procedure and releases the call and the base station resources.

If the fade timer 280 has not yet expired, then BTS Controller 225 sends a control signal to transmit power controller 270 to cause the transmit power controller 270 increase the transmission power for the null frames by a specified increment or step size. As previously mentioned, an exemplary power increment or step size is two decibels (2 dB) for each twenty millisecond (20 msec) frame.

After the transmit power controller 270 increases the power level of the null frames by one step size, then BTS Controller 225 determines whether the maximum power level for the null frames has been exceeded. If the maximum power level for the null frames has been exceeded, then the likelihood that the call will be successfully completed is very low.

Therefore, BTS Controller 225 ends the call and releases the resources of base station 101. If the maximum power level of the null frames has not been exceeded, then BTS Controller continues the call set-up procedure and BTS Controller 225 continues to send null frames to mobile station 111.

Figure 9:
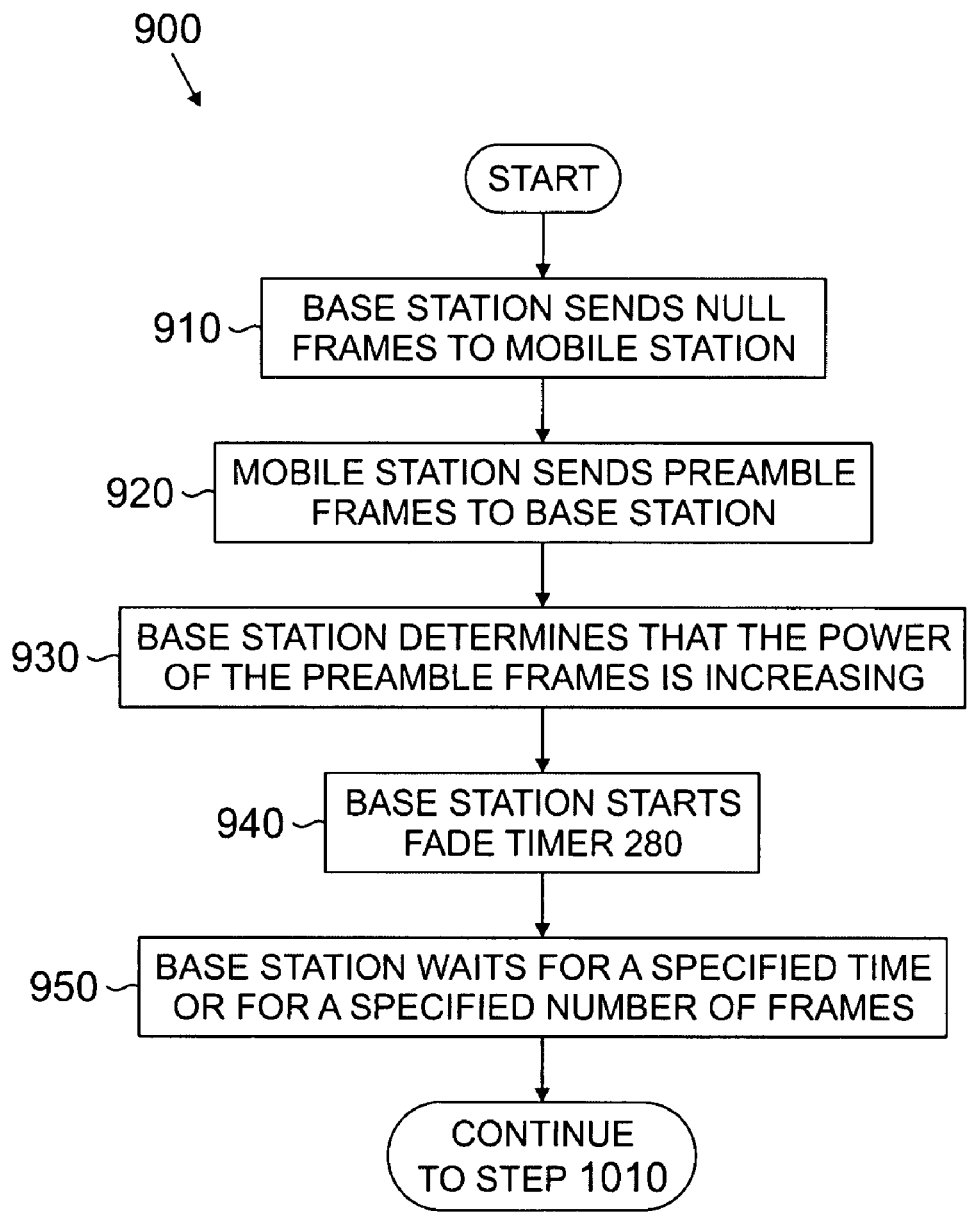
FIG. 9 is a flow diagram illustrating a fifth portion of the operation of the wireless network according to another embodiment of the present invention.

FIG. 9 is a flow diagram 900 illustrating a fifth portion of the operation of wireless network 100 according to one embodiment of the present invention. Base station 101 sends null frames to mobile station 111 (step 910). Mobile station 111 sends preamble frames to base station 101 (step 920). As previously mentioned, step 910 and step 920 occur simultaneously.

Base station 101 then determines that the power of the preamble frames from mobile station 111 is increasing (step 930). Base station 101 then starts fade timer 280 (step 940). Then base station 101 waits for a specified time or for a specified number of frames (step 950). Control then passes to step 1010 shown in FIG. 10.

Figure 10:
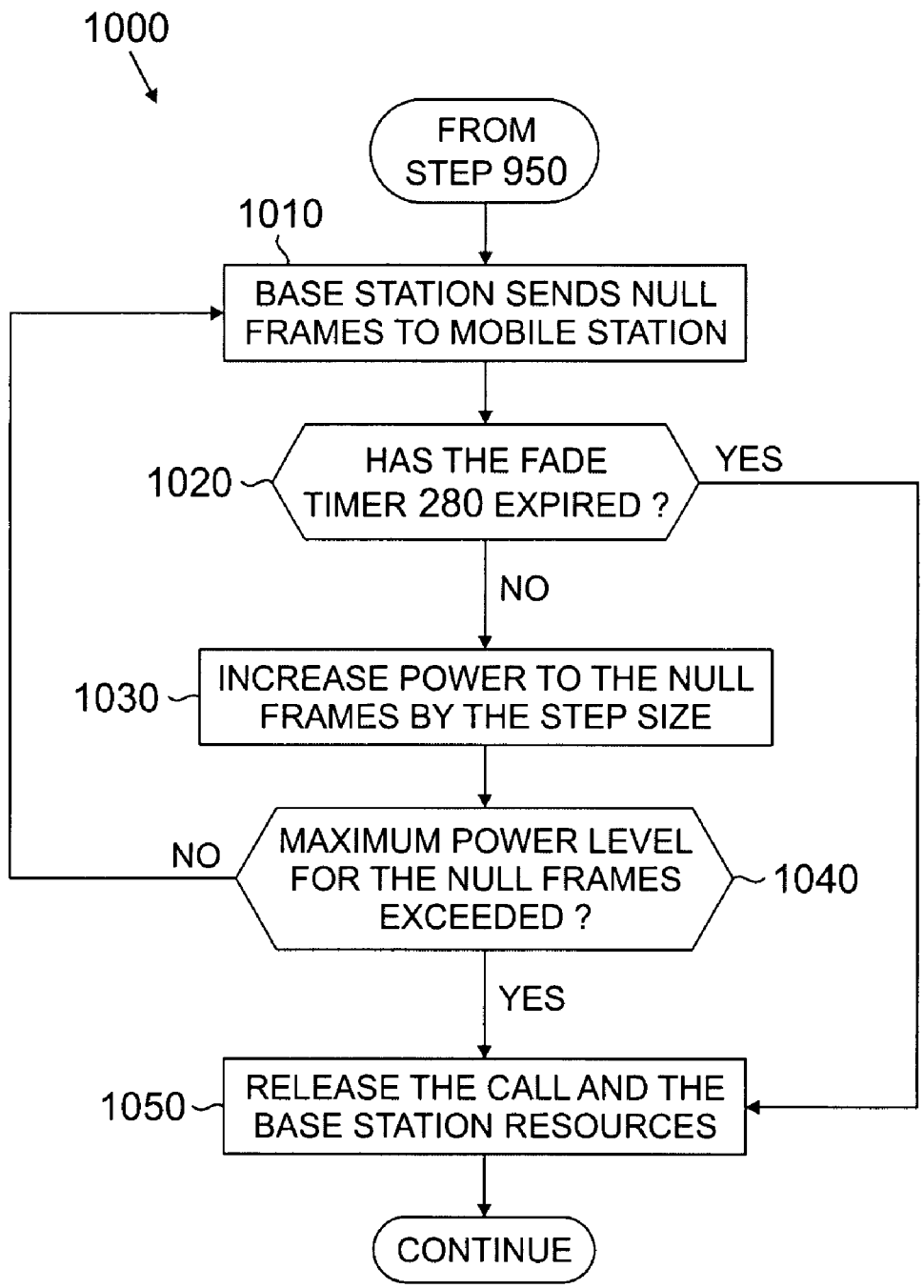
FIG. 10 is a flow diagram illustrating a sixth portion of the operation of the wireless network according to another embodiment of the present invention.

FIG. 10 is a flow diagram 1000 illustrating a sixth portion of the operation of wireless network 100 according to one embodiment of the present invention. Base station 101 determines whether the fade timer 280 has expired (decision step 1020). If the fade timer 280 has expired then base station 101 releases the call and the base station resources (step 1060). If the fade timer 280 has not expired then base station 101 increases the power of the null frames by the step size (step 1030).

Base station 101 then determines whether the maximum power level for the null frames has been exceeded (decision step 1040). If the maximum power level for the null frames has been exceeded then base station 101 releases the call and the base station resources (step 1050). If the maximum power level for the null frames has not been exceeded then base station 101 continues to send null frames to mobile station 111 (step 1010).

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a wireless network, a method of operating a base station during a call set-up procedure, the method comprising the steps of:
    transmitting null frames from said base station to a mobile station during the call set-up procedure;
    during the call set-up procedure, detecting in a preamble frame detector of said base station preamble frames from said mobile station;
    adjusting a power level of said null frames transmitted to said mobile station by said base station
    detecting at least one missing preamble frame from said mobile station; and
    in response to said detection of said at least one missing preamble frame from said mobile station, increasing a power level of null frames transmitted by said base station.

2. The method as set forth in claim 1, wherein said power level of said null frames is increased by a step size having a configurable value.

3. The method as set forth in claim 1, further comprising the steps of:
    providing in said base station a fade timer that has a configurable value;
    starting said fade timer when said preamble frame detector detects at least one missing preamble frame from said mobile station; and stopping a transmission of said null frames to said mobile station when said preamble frame detector detects at least one missing preamble frame from said mobile station.

4. The method as set forth in claim 3 further comprising the step of:
releasing a call between said base station and said mobile station when one of: said fade timer expires and a maximum power level for said null frames is exceeded.

5. The method as set forth in claim 3 wherein said configurable value of said fade timer is less than five seconds.

6. For use in a wireless network, a base station capable of releasing a call between said base station and a mobile station during a call set-up procedure, said base station comprising:
a transmitter that transmits null frames from the base station to a mobile station during the call set-up procedure;
a preamble frame detector that detects preamble frames transmitted to the base station by the mobile station during the call set-up procedure; and
a transmit power controller that adjusts a power level of null frames transmitted by the base station during the call set-up procedure, wherein the preamble frame detector detects at least one missing preamble frame from said mobile station; and the transmit power controller increases a power level of null frames transmitted by the base station in response to the preamble frame detector detecting the at least one missing preamble frame.

7. The base station as set forth in claim 6, wherein the power level of the null frames is increased by a step size having a configurable value.

8. The base station as set forth in claim 6, further comprising
a fade timer that has a configurable value,
wherein the fade timer is started when the preamble frame detector detects the at least one missing preamble frame from the mobile station, and
wherein the transmitter stops transmitting the null frames to the mobile station when the preamble frame detector detects the at least one missing preamble frame from the mobile station.

9. The base station as set forth in claim 6, wherein the base station releases a call between the base station and the mobile station when one of: the fade timer expires and a maximum power level for the null frames is exceeded.

10. The base station as set forth in claim 6, wherein the configurable value of the fade timer is less than five seconds.

11. The base station as set forth in claim 6, wherein the preamble frames received by the base station are transmitted at increased power by the mobile station when the mobile station detects a missing null frame transmitted by the base station.

12. A wireless network comprising a plurality of base stations, each of said plurality of base stations capable of releasing a call between said base station and a mobile station during a call set-up procedure, wherein said each base station comprises:
a transmitter that transmits null frames from the base station to a mobile station during the call set-up procedure;
a preamble frame detector that detects preamble frames transmitted to the base station by the mobile station during the call set-up procedure; and
a transmit power controller that adjusts a power level of null frames transmitted by the base station during the call set-up procedure, wherein the preamble frame detector detects at least one missing preamble frame from said mobile station; and the transmit power controller increases a power level of null frames transmitted by the base station in response to the preamble frame detector detecting the at least one missing preamble frame.

13. The wireless network as set forth in claim 12, wherein the power level of the null frames is increased by a step size having a configurable value.

14. The wireless network as set forth in claim 12, further comprising
a fade timer that has a configurable value,
wherein the fade timer is started when the preamble frame detector detects the at least one missing preamble frame from the mobile station, and
wherein the transmitter stops transmitting the null frames to the mobile station when the preamble frame detector detects the at least one missing preamble frame from the mobile station.

15. The wireless network as set forth in claim 14, wherein at least one of the base stations releases a call between the base station and the mobile station when one of: the fade timer expires and a maximum power level for the null frames is exceeded.

16. The wireless network as set forth in claim 14, wherein the configurable value of the fade timer is less than five seconds.

17. The wireless network as set forth in claim 16, wherein the mobile station transmits the preamble frames received by at least one of the base stations at an increased power level in response to the mobile station detecting a missing null frame transmitted by the at least one base station.

* * * * *